United States Patent
Ivandic et al.

(10) Patent No.: US 6,220,902 B1
(45) Date of Patent: Apr. 24, 2001

(54) METHOD AND APPARATUS FOR CONNECTING AN OBJECT TO A DEVICE

(75) Inventors: Ivan Ivandic, Penticton; Vladimir Ivandic, Summerland, both of (CA)

(73) Assignee: Unit Electrical Engineering Ltd., Okanagan Falls ( * ) Notice: Subject to any disclaimer, the term of this patent is extended or adjusted under 35 U.S.C. 154(b) by 0 days.

(21) Appl. No.: 09/311,619

(22) Filed: May 13, 1999

(51) Int. Cl.$^7$ ........................................................ H01R 4/38
(52) U.S. Cl. .................................................. 439/805; 439/727
(58) Field of Search .............................. 439/63, 581, 582, 439/583, 584, 585, 805, 807, 727

(56) References Cited

U.S. PATENT DOCUMENTS

| | | | |
|---|---|---|---|
| 391,226 | 10/1888 | Bowden | 403/314 |
| 1,936,009 | 11/1933 | Cummins | 24/126 |
| 3,600,765 | 8/1971 | Rovinsky et al. | 24/122.6 |
| 3,605,202 | 9/1971 | de Valenzuela et al. | 24/122.6 |
| 3,706,958 * | 12/1972 | Blanchenot | 439/584 |
| 3,822,442 | 7/1974 | Herbschleb et al. | 24/122.6 |
| 3,824,556 * | 7/1974 | Berkovits et al. | 439/727 |
| 3,952,377 | 4/1976 | Morell | 24/136 |
| 3,975,799 | 8/1976 | Kerr | 24/122.6 |
| 4,278,093 | 7/1981 | Lafortune et al. | 128/419 P |
| 4,367,568 | 1/1983 | Weiser | 24/122.6 |
| 4,454,633 | 6/1984 | de la Fuente et al. | 24/115 R |
| 4,459,722 | 7/1984 | Dziedzic et al. | 24/122.6 |
| 4,507,008 | 3/1985 | Adl et al. | 403/275 |
| 4,509,233 | 4/1985 | Shaw | 24/136 |
| 4,628,649 | 12/1986 | Jartoux | 52/223 |
| 4,648,683 * | 3/1987 | Botka | 439/583 |
| 4,744,691 | 5/1988 | Thal | 403/374 |
| 4,912,815 | 4/1990 | Jenkins | 24/122.3 |
| 5,000,705 * | 3/1991 | Kinka et al. | 439/805 |
| 5,018,251 | 5/1991 | Brown | 24/122.6 |
| 5,137,470 * | 8/1992 | Doles | 439/583 |
| 5,233,730 | 8/1993 | Milne et al. | 24/136 R |
| 5,308,026 | 5/1994 | Shaw | 248/63 |
| 5,435,745 * | 7/1995 | Booth | 439/583 |
| 5,890,684 | 4/1999 | Stewart et al. | 248/68.1 |
| 5,904,587 * | 5/1999 | Osypka et al. | 439/584 |

FOREIGN PATENT DOCUMENTS 0 069 194 A2   1/1983   (EP) .............................. B23B/31/20

* cited by examiner

*Primary Examiner*—Tulsidas Patel
(74) *Attorney, Agent, or Firm*—Kolisch Hartwell Dickinson McCormack & Heuser

(57) ABSTRACT

An apparatus and method for connecting an object to a device. The apparatus and method employ a device having a receptacle and a collet having jaws receivable in the receptacle such that the receptacle bears upon the jaws to close the jaws to grip an object disposed therein when the jaws are received in the receptacle.

22 Claims, 4 Drawing Sheets

METHOD AND APPARATUS FOR CONNECTING AN OBJECT TO A DEVICE

BACKGROUND OF THE INVENTION

This invention relates to methods and apparatus for connecting an object to a device, employing jaws operable to grip the object.

Method and apparatus for connecting objects to devices are often found in the art of wire connection systems wherein the wire is the object and the device is some type of anchor device such as a pole or fixed member secured to the ground. Such devices typically make use of a wedge effect wherein wedge members are placed about a cable and then the cable and wedge members are received in a bush such that they become jammed in the bush thereby gripping the wire. An example of a device of this type is disclosed in U.S. Pat. No. 3,952,377 to Morell.

Many conventional wire connection devices provide for the wire to extent entirely through the device. This, however, can be a problem as the wire may interfere with the mounting of the connection device to an object. Such interference renders this type of method of connection impractical where it is desirable to neatly or compactly connect a cable to a removable connector, for example.

The connection of wires to removable connectors is conventionally achieved by receiving a wire in a portion of a lug and then soldering the wire to the lug or crimping the lug to obtain a mechanical connection to the wire. Connections formed in this manner are subject to fatigue due to mechanical flexing of the wire, oxidation of the solder, and thermal cycling, especially where the connector is required to conduct relatively high currents sufficient to create heating within the connector. Expansion and contraction of a mechanical crimped lug can occur where current is cycled through the connector, eventually degrading the connection between the wire and the crimped lug over time. Consequently, a better method of connecting a wire to a connector or, more generally, for connecting an object to a device through the use of a connector would be desirable. The present invention addresses this need.

BRIEF SUMMARY OF THE INVENTION

The above need is addressed by providing a method and apparatus for connecting an object to a device wherein a receptacle is connected to the device and a collet having jaws receivable in the receptacle is positioned relative to the receptacle such that the receptacle bears upon the jaws to close the jaws to grip an object disposed therein when the jaws are received in the receptacle.

The device may include a male or female connector, for example, or may include an object such as a bus bar, for example. In general, any device to which the receptacle may be secured would be suitable.

The apparatus and method are particularly well suited to grip an object such as a multi-stranded wire cable such as used to carry electric current but may alteratively to used with a solid cable. In general, the object may include virtually any elongated object capable of being received in the jaws. In one embodiment, the device may include a housing, the housing have an electrical connector thereon, for example.

Also, in one embodiment, the collet includes a base ring and the jaws include a plurality of jaws depending axially from the base ring. The base ring is receivable in the receptacle which may be formed by a wall of a housing defining an opening therein for receiving the base ring. Preferably, the housing also has an opening therein for receiving a drawing member therethrough, the drawing member having a threaded portion for engaging a threaded portion of the base ring for use in drawing the collet into the receptacle as the drawing member is rotated. As the drawing member is rotated, the camming portions on the jaws cam against the wall of the receptacle to impart radial movement to the jaws as the jaws are drawn into the receptacle, through turning of the drawing member. This radial movement provides at least a component of the gripping force provided by the jaws on the object.

In another embodiment, the housing includes a mounting portion and has an opening for receiving the drawing member disposed in the mounting portion. This facilitates mounting the housing to a mounting device by receiving the housing and at least a portion of the mounting device between the collet and the drawing member such that when the drawing member is rotated the collet and the drawing member are drawn together to squeeze the housing and at least a portion of the mounting device therebetween while at the same time closing the jaws.

In accordance with another aspect of the invention, there is provided a method of connecting an object to a device, the method comprising moving jaws of a collet into an opening defined by a receptacle of the device whereby the receptacle bears upon the jaws to close the jaws to grip an object disposed in the jaws.

Preferably, the method includes threadedly engaging a collet with a threaded portion of a drawing member and rotating a portion of the drawing member extending outside the receptacle to draw the collet and jaws into the receptacle.

In accordance with another aspect of the invention, there is provided a device having a receptacle and a collet having jaws receivable in the receptacle such that the receptacle bears upon the jaws to close the jaws to grip an object disposed therein when the jaws are received in the receptacle.

Other aspects and features of the present invention will become apparent to those ordinarily skilled in the art upon review of the following description of the specific preferred embodiments of the invention in conjunction with the accompanying figures.

BRIEF DESCRIPTION OF THE SEVERAL VIEWS OF THE DRAWING

In drawings which illustrate embodiments of the invention.

DETAILED DESCRIPTION OF THE INVENTION

Reference will now be made in detail to the preferred implementations and embodiments of the invention, examples of which are illustrated in the accompanying drawings. Wherever appropriate the same reference numbers will be used throughout the drawings to refer to the same or like parts.

Figure 1:
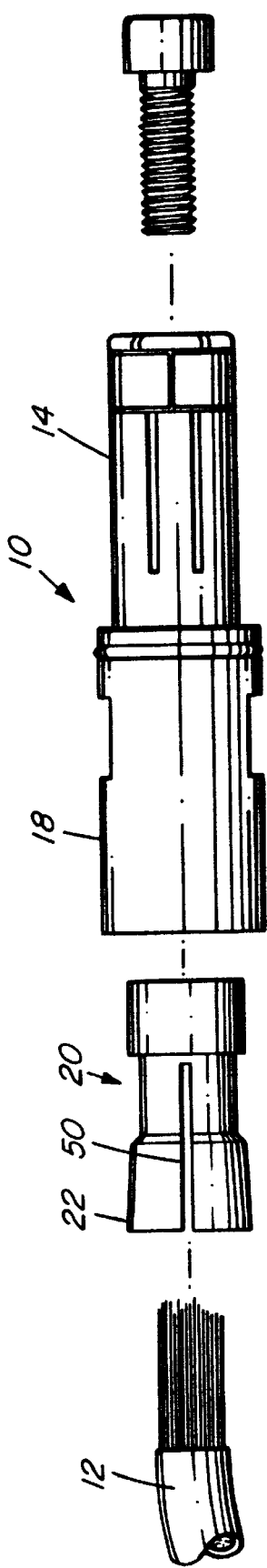
FIG. 1 is an exploded view of an un-assembled apparatus according to a first embodiment of the invention.

FIG. 1 depicts an apparatus 10 for connecting a object to a device, in accordance with a first embodiment of the invention. In this embodiment, the object is a multistranded wire cable 12 and the device is a male connector 14.

Figure 2:
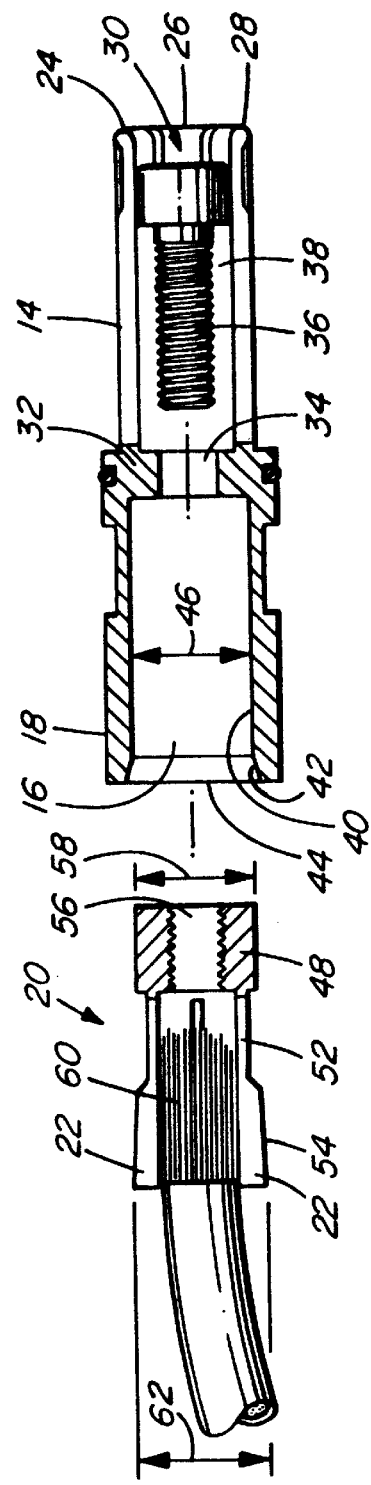
FIG. 2 is a cross-sectional view of the apparatus shown in FIG. 1 in a first stage of assembly.

Referring to FIG. 2, the device 14 has a receptacle shown generally at 16 formed in a housing 18 secured thereto.

Referring to FIGS. 1 and 2, a collet is shown generally at 20 and had jaws 22 which are receivable in the receptacle 16 such that the receptacle bears upon the jaws 22 to close the jaws to grip the object, in this embodiment, an end portion of the cable 12 disposed therein, when the jaws are received in the receptacle.

Referring to FIG. 2, the male connector 14 and the housing 18 are formed from a single piece of solid material. The piece is formed to have first and second portions which act as the male connection 14 and the housing 18 respectively. It will be appreciated that the male connector may alternatively be a female connector or a combination of both a male and a female connector. Also, the connector and the housing may be preformed from separate pieces and secured together to form a unitary device.

The male connector 14 is formed with a plurality of elongated arcuate finger members, only three of which are shown at 24, 26 and 28. The arcuate finger members are formed such that a cylindrical well 30 is created between them. A bottom portion of the cylindrical well 30 is defined by an intermediate portion 32 which effectively connects the main connector 14 and the housing 18 together. The intermediate portion has an opening 34 therethrough for receiving a threaded portion 36 of a threaded drawing member, shown generally at 38, therethrough.

The housing 18 extends from the intermediate portion 32 on a side opposite the male connector 14 and has a generally cylindrical outer shape with the receptacle 16 being formed therein. In this embodiment, the receptacle 16 is cylindrical in shape and is defined by a wall 40 having a slight tapered portion 42 defining an opening 44 to the receptacle 16.

The receptacle 16 has a diameter 46 which, in this embodiment, is larger than a diameter of the opening 34 for receiving the threaded portion 34.

Still referring to FIG. 2, the collet 20 had a base find 48 from which the plurality of jaws 22 depends, in an axial direction. In this embodiment, there are four jaws 22, only two of which are shown.

In this embodiment, the jaws 22 and the base ring 48 are formed from the same piece of material, the jaws being formed by boring a cylindrical hole axially in the material and cutting longitudinally extending slots, one of which is shown at 50 in FIG. 1, in mutually orthogonal directions when viewed along an axis of the base ring 48. The base find 48 has a diameter 58 which is slightly less than the diameter 46 of the receptacle 16. The base ring 48 further has a threaded opening, shown generally at 56, which in this embodiment extends entirely through the base ring 40 in an axial direction.

The jaws 22 are formed to include a collar portion 52 of reduced diameter relative to the base ring, to provide a degree of flexibility to the jaws. The jaws further have respective camming portions 54 which are formed from arcuate tapered surfaces on distal portions of the jaws 22.

The camming portions 54 have an initial diameter 60, approximately the same as the base ring diameter 58, but have a diameter 62 slightly larger than the diameter 46 of the receptacle 16, at distal end portions thereof.

Operation

Referring to FIG. 2, in operation, a user removes any inculation from the end of the wire cable 12 sufficiently such that cable strands of the wire are entirely received between the jaws 22. It is preferable that the jaws have been preformed to define a receiving area for receiving the bared end of the cable such that the cross-sectional area of the receiving area defined by the jaws is approximately the came as the cross-sectional area of the bared wire end.

Figure 3:
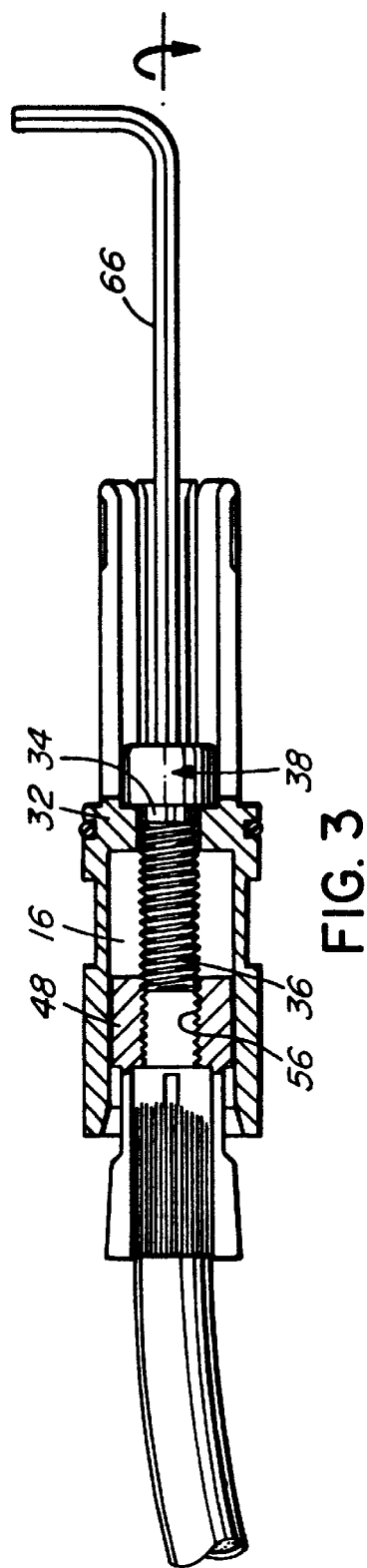
FIG. 3 is a cross-sectional view of the apparatus shown in FIG. 1 in a second stage of assembly.

Referring to FIG. 3, the base ring 48 is then inserted into the receptacle 16 and the threaded drawing member 38 is placed in the cylindrical well 30 such that the threaded portion 36 is inserted through the opening 34 in the intermediate portion 32 and is engaged with the threaded portion 56 of the base ring 48 in the receptacle 16.

In this embodiment, the drawing member 38 has a hex socket, not shown, for receiving an end of a hexagonal wrench 66 to facilitate rotation of the drawing member 38.

Figure 4:
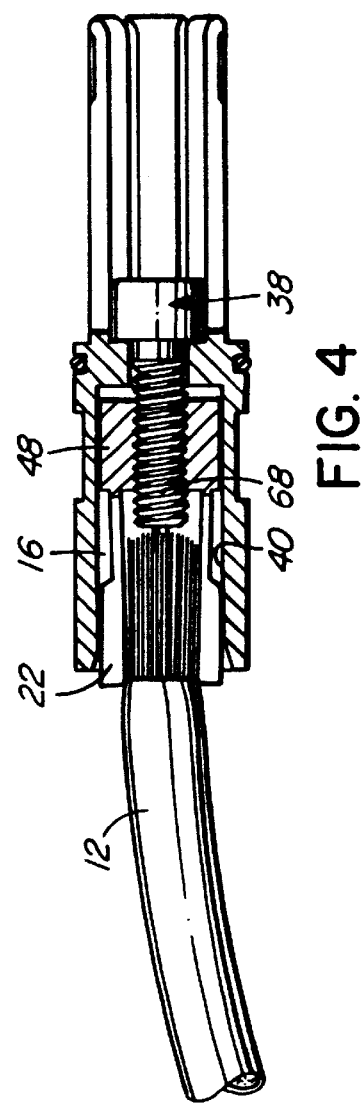
FIG. 4 is a cross-sectional view of the apparatus shown in FIG. 1 in a third stage of assembly.

Referring to FIG. 4, rotation of the drawing member 38 draws the base ring 48 into the receptacle 16 thereby drawing the jaws 22 into the receptacle and causing the camming portions on the jaws to cam against the wall 40 of the receptacle 16 to impart radial inward movement of the jaws thereby causing the jaws 22 to grip the bared wire end disposed therein.

As the drawing member 38 is rotated, a portion 68 of the threaded portion extends into the receiving area defined by the jaws and displaces at least some strands in the wire, reducing the area in which the wire is contained thereby increasing the force between the jaws 22 and the bared wire end.

Figure 5:
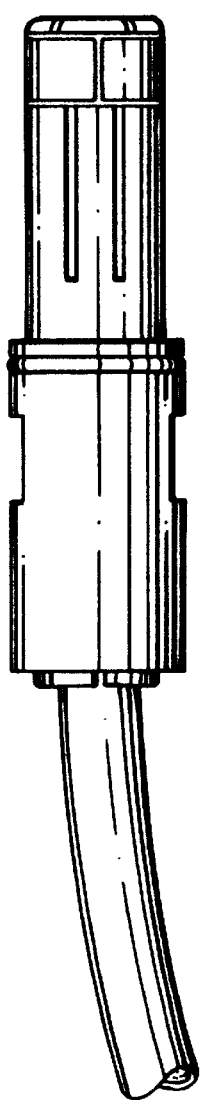
FIG. 5 is a side view of the apparatus shown in FIG. 1, in a completely assembled state.

Referring to FIG. 5, the resulting connection is neat and compact and is removable simply by reverse rotation of the drawing member 38 shown in FIGS. 2–4.

Alternatives

Figure 6:
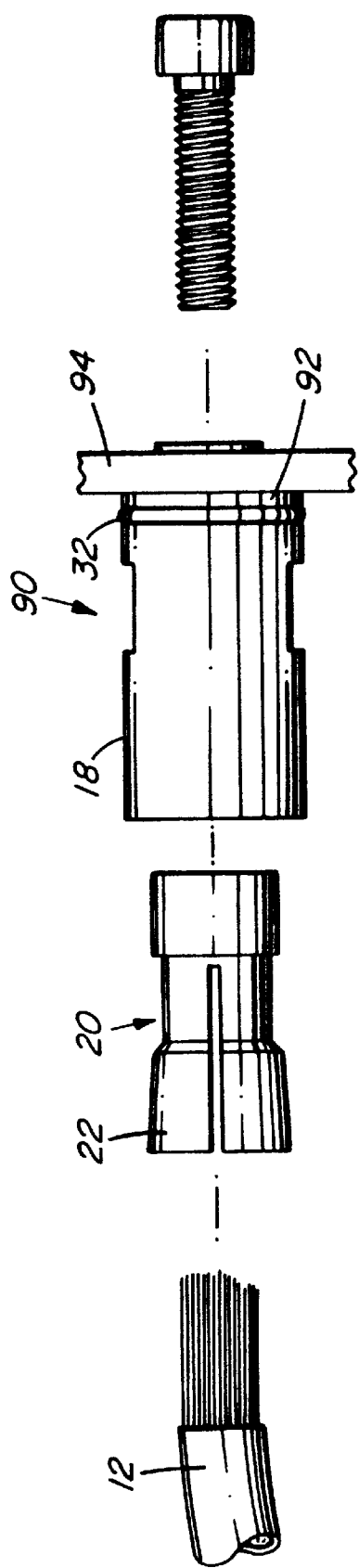
FIG. 6 is an exploded view of an un-assembled apparatus according to a second embodiment of the invention.

Referring to FIG. 6, an apparatus according to a method embodiment of the invention is shown generally at 90. In this embodiment, the apparatus is identical to that shown in FIGS. 1–5 with the exception that there is no male connector 14. Rather, the housing 18 includes the intermediate portion 32, however, the intermediate portion 32 is terminated in a flat, circular surface 92. This arrangement facilitates connection of the housing 18 to a bus bar 94 or other device.

Figure 7:
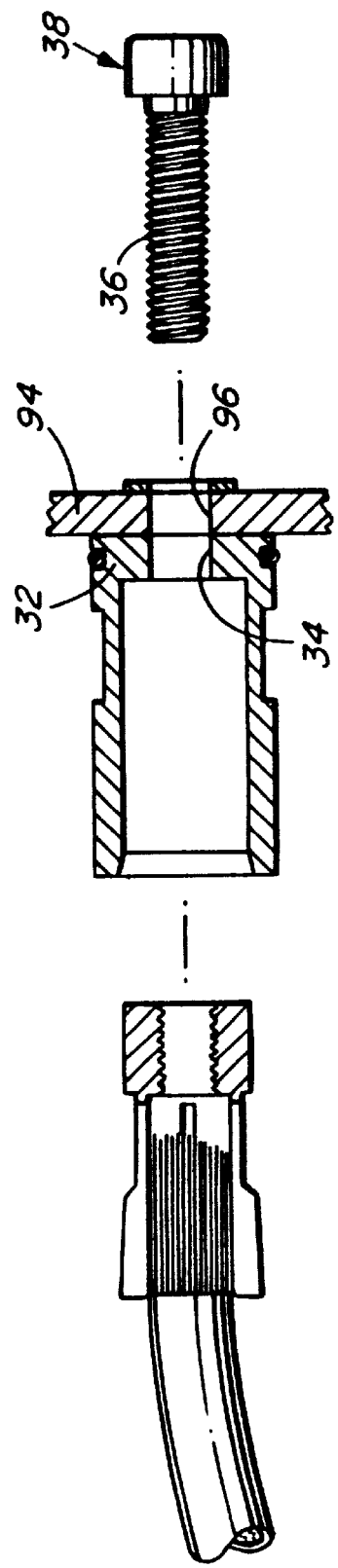
FIG. 7 is a cross-sectional view of the apparatus shown in FIG. 6 is a first stage of assembly.

Referring to FIG. 7, to facilitate such connection, the bus bar is formed with an opening 96 of a diameter approximately equal to the diameter of the opening 34 in the intermediate portion 32. Thus, the threaded portion 36 of the drawing member 38 is receivable therethrough.

Figure 8:
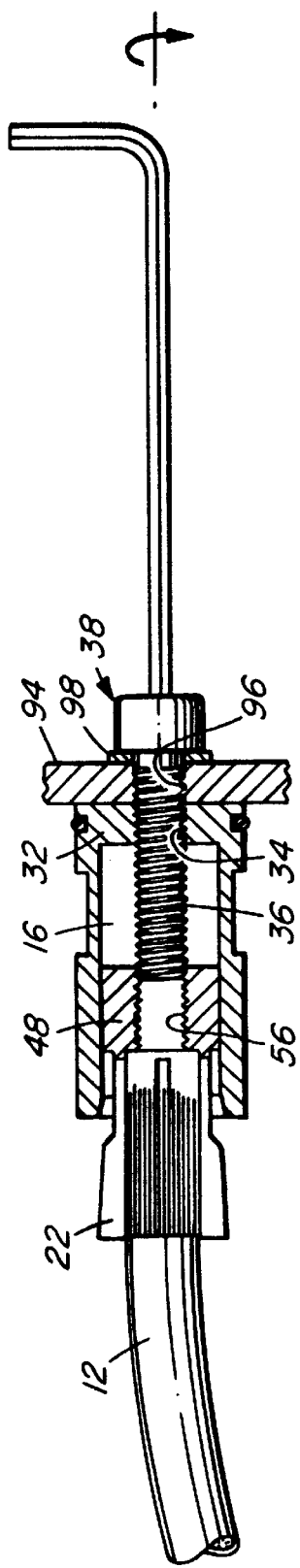
FIG. 8 is a cross-sectional view of the apparatus shown in FIG. 6 in a second stage of assembly.

Referring to FIG. 8, after insertion the cable end portion into the receiving area defined by the jaws 22, and after inserting the base ring 48 into the receptacle 16, the threaded portion 36 of the drawing member 38 to inserted through a washer 98, through the opening 96 in the bus bar 94 and through the opening 34 in the intermediate portion 32 such that the threaded portion is within the receptacle 16 and is engaged with the threaded portion 56 of the base ring 48.

Figure 9:
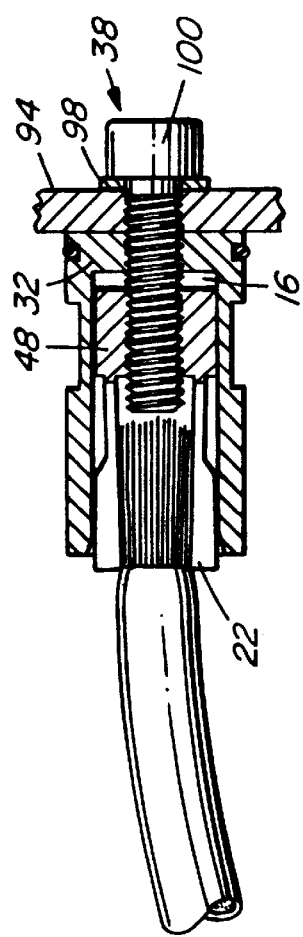
FIG. 9 is a cross-sectional view of the apparatus shown in FIG. 6 in a third stage of assembly.

Then, upon rotating the drawing member 38 as described above in connection with the first embodiment, the base ring 48 and jaws 22 with the bared wire end disposed therein, are drawn into the receptacle 16 as shown in FIG. 9, while at the same time the intermediate portion 32 of the housing and the bus bar 94 and the washer 98 are squeezed between a head portion 100 of the drawing member 38 and the base ring 48. Thus, the drawing member is used both to draw the base ring 48 to actuate the jaws 22 to grip the cable end portion while at the same time mount the housing 18 to the bus bar 94.

Figure 10:
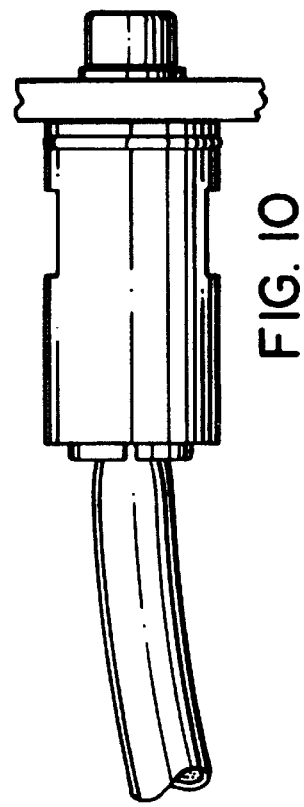
FIG. 10 is a side view of the apparatus shown in FIG. 6, in a completely assembled state.

Referring to FIG. 10, the resulting connection is thus formed in a neat, compact unit.

It will be appreciated that the bus bar is only exemplary of a device to which the housing may be secured. In general, the bus bar may be replaced by any device having an opening through which the drawing member may extend for engagement with the base ring.

Alternatively, the drawing member may be integral with and fixed relative to the device to which the housing is to be attached, in which case the base ring and device will be rotatable relative to each other to facilitate the above described actuation of the jaws.

While specific embodiments of the invention have been described and illustrated, such embodiments should be considered illustrative of the invention only and not as limiting the invention as construed in accordance with the accompanying claims.

What is claimed is:

1. A method of connecting an object to a device, the method comprising drawing jaws of a collet into an opening defined by a receptacle of the device, the device having an electrical connector on a side of said device, opposite said receptacle, whereby said receptacle bears upon said jaws to close said jaws to grip an object disposed in said jaws, by threadedly engaging said collet with a threaded portion of a drawing member separate from the receptacle and extending into said receptacle.

2. A method as claimed in claim 1 wherein drawing includes rotating said drawing member.

3. A method as claimed in claim 2 wherein rotating said drawing member includes turning a portion of said drawing member extending outside of said receptacle.

4. A method as claimed in claim 1 further including conducting electric current from said object to said receptacle through said collet.

5. An apparatus for connecting an object to a device, the apparatus comprising:
   a) a device having a receptacle and an electrical connector on a side of said device, opposite said receptacle;
   b) a collet having jaws receivable in said receptacle such that said receptacle bears upon said jaws to close said jaws to grip an object disposed therein when said jaws are received in said receptacle; and
   c) a drawing member separate from said receptacle, said drawing member having a threaded portion extending into said receptacle for threadedly engaging said collet to draw said collet into said receptacle to close said jaws to grip said object.

6. An apparatus as claimed in claim 5 wherein said device includes a housing.

7. An apparatus as claimed in claim 5 wherein said collet includes a base ring and wherein said jaws include a plurality of jaws depending axially from said base ring.

8. An apparatus as claimed in claim 7 wherein said base ring has a threaded portions.

9. An apparatus as claimed in claim 8 wherein said threaded portion of said drawing member is complementary to said threaded portion of said base ring for engaging said threaded portion of said base ring to draw said collet into said receptacle as said drawing member is rotated.

10. An apparatus as claimed in claim 7 wherein said jaws have respective camming portions for camming against said receptacle to impart radial movement to said jaws when said jaws are received in said receptacle.

11. An apparatus as claimed in claim 10 wherein said device includes a housing having a wall defining an opening and wherein said camming portions bear upon said wall when said jaws are received in said housing.

12. An apparatus as claimed in claim 11 wherein said threaded portion of said drawing member is complementary to a threaded portion of said base ring for engaging said threaded portion of said base ring to draw said collet into said receptacle as said drawing member is rotated.

13. An apparatus as claimed in claim 12 wherein said housing has an opening for receiving said drawing member.

14. An apparatus as claimed in claim 5 wherein said device has an opening between said receptacle and said electrical connector, for receiving said drawing member therein to permit said drawing member to engage said collet.

15. An apparatus as claimed in claim 5 wherein said electrical connector is formed with a plurality of elongated finger members.

16. An apparatus for connecting an object to a device, the apparatus comprising:
   a) a device having a receptacle;
   b) a collet having jaws receivable in said receptacle such that said receptacle bears upon said jaws to close said jaws to grip an object disposed therein when said jaws are received in said receptacle; and
   c) a drawing member separate from said receptacle, said drawing member having a threaded portion extending into said receptacle for threadedly engaging said collet to draw said collet into said receptacle to close said jaws to grip said object;

wherein:

said collet includes a base ring and wherein said jaws include a plurality of jaws depending axially from said base ring;

said jaws have respective camming portions for camming against said receptacle to impart radial movement to said jaws when said jaws are received in said receptacle;

said device includes a housing having a wall defining, said receptacle;

said camming portions bear upon said wall when said jaws are received in said housing;

said threaded portion of said drawing member is complementary to a threaded portion of said base ring for engaging said threaded portion of said base ring to draw said collet into said receptacle as said drawing member is rotated;

said housing has an opening for receiving said drawing member;

said housing includes a mounting portion; and said opening for receiving said drawing member is disposed in said mounting portion such that said housing is mountable to a mounting device by receiving said housing and at least a portion of said mounting device between said collet and said drawing member such that when said drawing member is rotated, said collet and said drawing member are drawn together to squeeze said housing and said at least a portion of said mounting device therebetween, while closing said jaws.

17. An apparatus as claimed in claim 16 wherein at least one of said camming portions is tapered.

18. An apparatus for connecting an object to a device, the apparatus comprising:
   a) a device including a housing having a wall defining a receptacle and having an opening for receiving a drawing member, and including an electrical connector on a side of said device, opposite said receptacle;
   b) a collet having a base ring and a plurality of jaws depending axially from said base ring and receivable in said receptacle, said jaws having respective camming portions for camming against said wall to impart radial movement to said jaws to close said jaws to grip an object disposed therein when said jaws are received in said receptacle; and
   c) a drawing member having a threaded portion receivable in said opening for engaging a threaded portion of said base ring to draw said collet into said receptacle when said drawing member is rotated.

19. An apparatus as claimed in claim 18 wherein said electrical connector is positioned on said housing such that said electrical connector is operable to receive said drawing member therein to permit said drawing member to be received in said opening for receiving said drawing member.

20. An apparatus for connecting an object to a device, the apparatus comprising:
   a) a device including a housing having a wall defining a receptacle and having an opening for receiving a drawing member;
   b) a collet having a base ring and a plurality of jaws depending axially from said base ring and receivable in said receptacle, said jaws having respective camming portions for camming against said wall to impart radial movement to said jaws to close said jaws to grip an object disposed therein when said jaws, are received in said receptacle; and
   c) a drawing member having a threaded portion receivable in said opening for engaging a threaded portion of said base ring to draw said collet into said receptacle when said drawing member is rotated;
   wherein said housing includes a mounting portion and wherein said opening from receiving said drawing member is disposed in said mounting portion such that said housing is mountable to a mounting device by receiving said housing and at least a portion of said mounting device between said collet and said drawing member such that when said drawing member is rotated, said collet and said drawing member are drawn together to squeeze said housing and said at least a portion of said mounting device therebetween, while closing said jaws.

21. An apparatus as claimed in claim 20 wherein at least one of said camming portions is tapered.

22. An apparatus for connecting an object to a device, the apparatus comprising:
   a) a device having a receptacle and an electrical connector on a side of said device, opposite said receptacle;
   b) gripping means for gripping an object, said gripping means being receivable in said receptacle and including a collet having a plurality of jaws for gripping said object;
   c) means for actuating said gripping means when said gripping means is received in said receptacle, said means for actuating, including respective camming portions on said jaws and a wall on said receptacle for cooperating with said camming portions to close said jaws as said collet is moved into said receptacle; and
   d) drawing means separate from said receptacle for drawing said gripping means into said receptacle, said drawing means including a member threadedly engageable with said collet.

* * * * *